US007564454B1

(12) United States Patent
Shing et al.

(10) Patent No.: US 7,564,454 B1
(45) Date of Patent: Jul. 21, 2009

(54) METHODS AND DISPLAYS HAVING A SELF-CALIBRATING DELAY LINE

(75) Inventors: Peter Shing, San Jose, CA (US); Xin Liu, Mountain View, CA (US); Min Du, San Jose, CA (US); Qingping Zheng, Santa Clara, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 762 days.

(21) Appl. No.: 11/005,139

(22) Filed: Dec. 6, 2004

(51) Int. Cl.
*G06F 3/038* (2006.01)

(52) U.S. Cl. ........................................ 345/213; 345/99

(58) Field of Classification Search ................. 345/211, 345/99, 213, 698, 699, 204, 690
See application file for complete search history.

(56) References Cited

U.S. PATENT DOCUMENTS

| | | | | |
|---|---|---|---|---|
| 4,540,982 | A * | 9/1985 | Jalovec | 345/14 |
| 5,216,301 | A * | 6/1993 | Gleeson et al. | 327/119 |
| 5,307,085 | A * | 4/1994 | Nakamura | 345/99 |
| 5,396,258 | A * | 3/1995 | Zenda | 345/3.2 |
| 5,751,279 | A * | 5/1998 | Okumura | 345/212 |
| 5,790,111 | A * | 8/1998 | Wood et al. | 345/213 |
| 6,144,355 | A * | 11/2000 | Murata et al. | 345/99 |
| 6,288,699 | B1 * | 9/2001 | Kubota et al. | 345/99 |
| 6,320,572 | B1 * | 11/2001 | Takabayashi et al. | 345/204 |
| 6,337,682 | B1 * | 1/2002 | Hwang | 345/213 |
| 6,407,729 | B1 * | 6/2002 | Moon | 345/99 |
| 6,452,592 | B2 * | 9/2002 | Zhang et al. | 345/213 |
| 2002/0004926 | A1 * | 1/2002 | Erickson | 714/814 |
| 2003/0160753 | A1 * | 8/2003 | McCartney | 345/99 |

OTHER PUBLICATIONS

Poniatowski, Susan, "An Introduction to FPD Link," National Semiconductor Application Note 1032, Jul. 1998.

Kim et al., "P-16: A New Driving Method to Compensate for Row Line Signal Propagation Delays in an AMLCD," SID 04 Digest 280-283, 2004.

Zajac, Craig, "RSDS Flat Panel Display Design Guidelines Part 1," National Semiconductor, Application Note 1234, May 2002.

Zajac, Craig, "Using Smart Charge Sharing to Reduce Power and Boost Column Driver Performance," National Semiconductor, Application Note 1235, May 2002.

* cited by examiner

*Primary Examiner*—Amr Awad
*Assistant Examiner*—Jeff Pelligrino
(74) *Attorney, Agent, or Firm*—Darby & Darby PC

(57) ABSTRACT

A driver arrangement for a display includes at least one driver, such as a column driver, and a delay line arrangement coupled to the driver. The delay line arrangement delays a data signal provided to the driver by a delay period selectable from a plurality of possible delay periods. The delay line arrangement includes a calibration module that, when requested, is configured and arranged to adjust a current delay period produced by the delay line arrangement towards a predetermined delay period. Displays can include the driver arrangement to provide self-calibration of the delay line.

16 Claims, 5 Drawing Sheets

METHODS AND DISPLAYS HAVING A SELF-CALIBRATING DELAY LINE

FIELD

The inventions are directed to displays, such as liquid crystal displays, with individually addressable pixel arrays and methods of displaying images using the displays. In addition, the inventions are directed to liquid crystal displays and drivers for liquid crystal displays.

BACKGROUND OF THE INVENTION

Liquid crystal displays (LCD) and other displays address each pixel individually to form an image. Often the pixels are addressed by row and column. In one embodiment, as each row is addressed, a data signal is sent to a column driver for the pixels along the row as indexed by the column. The data signal must be offset from the column driver clock to allow the data signal time (tsetup) to setup prior to the clock edge and time (thold) to hold subsequent to the clock edge to ensure that the data is properly and accurately conveyed by the column driver. Conventionally, a delay line is inserted to delay the data signal relative to the clock. The delay line often includes a number of selectable delay periods. The desired delay period is selected during manufacture of the display.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

Figure 1:
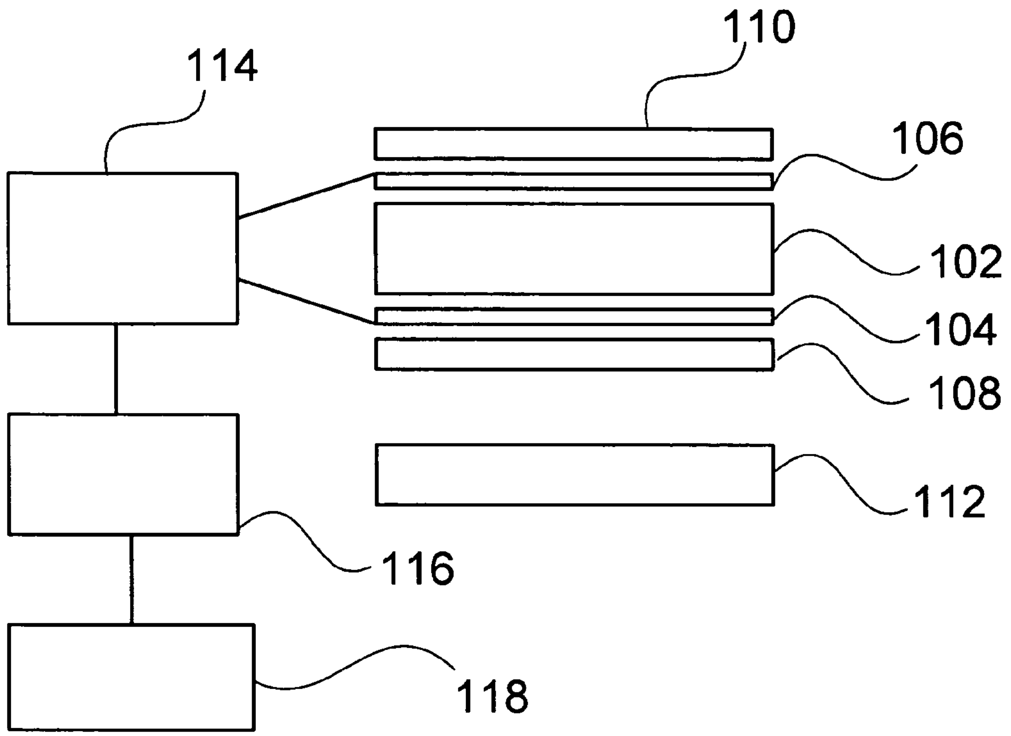
FIG. 1 is a schematic illustration of one embodiment of a transmissive liquid crystal display (LCD)

The present inventions are directed to the area of displays, such as liquid crystal displays, with individually addressable pixel arrays and methods of displaying images using the displays. In addition, the inventions are directed to liquid crystal displays and drivers for liquid crystal displays.

The term "display" includes a variety of products such as, for example, televisions and monitors for computers and other devices, as well as displays for mobile phones, personal desk assistants (PDAs), and the like. Many types of displays have individually addressable pixels. Such displays include, for example, liquid crystal displays (LCD), plasma displays, and organic light emitting diode (OLED) displays. The number of pixels in the array and the size of the display determines, at least in part, the resolution achievable by the display.

Some displays are monochromatic, such as black and white displays, and other displays are color. The number of available colors and the number of shades of color can vary with the display. Some displays have only a limited number of colors, such as 16, 32, or 64 colors. Many color displays, however, are able to generate thousands or millions of different colors. Color displays often have pixels of different colors (e.g., red, blue, and green) next to each other to create the range of colors.

The pixels of such displays are typically arranged in a row and column format. In one embodiment, the display is updated in a row-by-row fashion in which a row is addressed and then control signals are provided to each of the pixels in the row by one or more column drivers. (It will be recognized that the column and row designations and functions can be switched without altering the applicability of the present inventions.) Data signals are provided to the column driver to control the brightness of each individual pixel. For example, a pixel can be turned on or off and, in many displays intermediate levels of brightness (often referred to as "gray scale") can be signaled by the data, for example, by varying voltage between electrodes of a selected pixel.

The data signals are typically offset from the column driver clock so that the data signal has time (tsetup) to set up establish the data signal prior to the clock edge and time (thold) to hold the data after the clock edge. The establishment of the data signal during tsetup and thold help ensure that the control signals are accurately and properly provided to the individual pixels. Failure to maintain the data signal for the tsetup and thold periods can result in display errors.

Conventionally, a delay line has been used to delay the data signals with respect to the clock. The appropriate delay period will typically depend on the design of the driver arrangement and associated circuitry, as well as the particular driver selected for the display. To facilitate product design, a delay line with multiple, selectable delay periods can be used to allow a designer to select the delay period that fits the circuit design and selected driver. Such a selection can occur, for example, during the design process or during manufacture. Once the desired delay period is selected and the display constructed, the delay period generally can not be altered without manually altering the circuitry. In other words, the delay period is fixed by the designer or manufacturer.

A number of issues can arise with a fixed delay period. For example, once the display has been designed the manufacturer or designer may want to use a different column driver or other circuitry component. If the fixed delay period is not appropriate for the revised circuit with the new component, the circuitry may need to be further altered to obtain the correct delay period. In addition, variations in voltage and/or temperature or other environmental conditions can result in variations in the fixed delay period.

Instead of a fixed delay line, a calibrating delay line can be used. The calibrating delay line can modify the delay period based on calibrations performed initially and/or periodically when the display is manufactured or used.

One example of a suitable display is a liquid crystal display (LCD). One embodiment of a LCD is schematically illustrated in FIG. 1, although it will be understood that many LCD's include additional or alternative components that are not illustrated in FIG. 1 including, but not limited to, color filters, pre- and postpolarizers, brightness enhancing films, etc. A LCD typically includes a liquid crystal cell with liquid crystal material 102 disposed between two sets of electrodes

104, 106. Any suitable liquid crystal material can be used including, but not limited to, twisted nematic (TN), supertwisted nematic (STN), in-plane switching (IPS), vertically aligned (VA) (including patterned vertically aligned (PVA) and multidomain vertically aligned (MVA)), cholesteric, ferroelectric, and polymer dispersed liquid crystal materials. At least one of the sets of electrodes 104, 106 is an individually addressable set of electrodes so that each of the pixels of the LCD can be individually addressed. The other set of electrodes 104, 106 can also be individually addressable or it can be one or more common electrodes for all or a portion of the pixels.

The liquid crystal material 102, in response to signals from the electrodes 104, 106, can modify the polarization of light incident on the liquid crystal material. In at least some embodiments, the liquid crystal material rotates the polarization of polarized light depending on the orientation of the liquid crystal material which, in turn, depends on the signals from the electrodes. The LCD also includes a polarizer 108 to polarize light incident on the liquid crystal material and an analyzer 110 (also a polarizer) to analyze the light after it has been transmitted through the liquid crystal material. The polarizer and analyzer can be linear or circular polarizers and may have optical axes that are parallel or orthogonal to each other.

The LCD of FIG. 1 is illustrated as a transmissive LCD with light being provided from a backlight 112. Other LCDs are reflective, utilizing, for example, ambient light for illumination of the liquid crystal material, or LCDs can be transflective, utilizing, for example, a backlight and ambient light to illuminate the liquid crystal material.

LCDs can operate in one of at least two different modes depending on the orientation of the polarizers and the initial orientation of the liquid crystal material when there is no signal applied to the electrodes. One mode is "normally black" in which, for a transmissive LCD, no light is transmitted by the LCD when there is no signal applied to the electrodes. Another mode is "normally white" in which, for a transmissive LCD, the maximum amount of light is transmitted by the LCD when there is no signal applied to the electrodes.

Electrical signals are provided to the electrodes 104, 106 using electrical circuitry 114. The LCD can be a passive matrix or an active matrix device or use any other addressing and driving method or device. Control of the signals is typically provided by a processor 116 and its associated memory 118.

The processor 116 and its associated memory 118 (optionally with other components of the LCD, such as the electrical circuitry 114 and electrodes 104, 106) can operate as a display control device. The processor 116 can be any processor that can operate the LCD. The processor 116 can include a microprocessor and, optionally, other electronic circuitry.

The memory 118 can include information, such as look-up tables and software, used by the processor to operate the LCD. Alternatively, any software function can be performed by hardware or by a combination of software and hardware.

In a typical LCD, the electric field generated by providing a voltage between the electrodes 104, 106 corresponding to a particular pixel typically determines the orientation of the liquid crystal material of that pixel. The orientation of the liquid crystal material generally determines the degree of modification of the polarization of light transmitted through the liquid crystal material of the pixel. Modification of the polarization will, in turn, result in variation in the brightness of the pixel. The orientation, and correspondingly, the degree of modification of the light polarization, can be altered by altering the signal (e.g., voltage) applied to the electrodes. Typically, the liquid crystal material will reorient if the electric signal is above a threshold signal level (e.g., a threshold voltage). Furthermore, applying a signal greater than a saturation signal level (e.g., a saturation voltage) will generally achieve little or no additional reorientation of the liquid crystal material.

Figure 2:
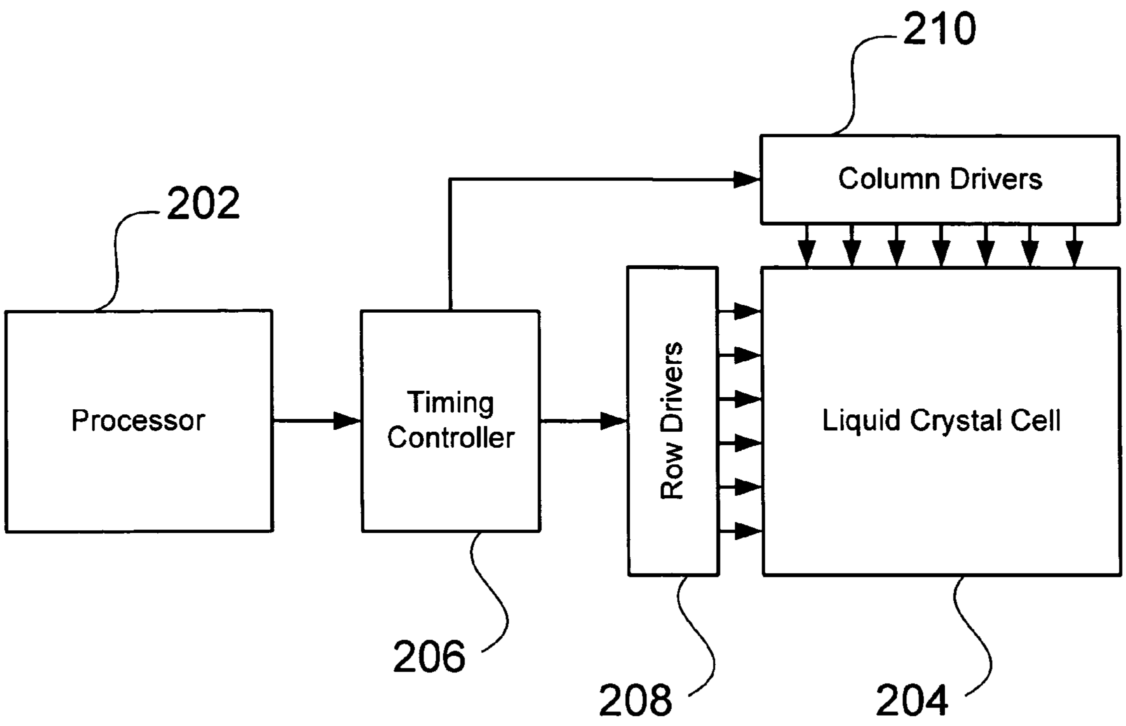
FIG. 2 is a schematic illustration of one embodiment of a portion of the display of FIG. 1.

FIG. 2 illustrates schematically a portion of the processor and electrical circuitry of one embodiment of a display. The display includes a processor 202, a liquid crystal display cell 204, a timing controller 206, row drivers 208, and column drivers 210. The processor 202 typically includes components for receiving or generating an image and converting the image into data signals that can be sent to the row and column drivers 208, 210 to generate the image on the liquid crystal display cell. The processor 202 can be a part of, for example, a computer, a television receiver, a mobile telephone, or the like.

The liquid crystal display cell 204 includes the liquid crystal material and the electrodes that are coupled to the row and column drivers 208, 210. These electrodes typically define pixels that are individually addressable. The timing controller 206 receives data signals from the processor 202 and delivers the signal to the row and column drivers 208, 210 with the correct timing to permit correct addressing of the pixels.

In at least one embodiment, the row drivers 208 address a single row of pixels at a time. The column drivers 210 are provided with a data signal that indicates for each pixel in the row the brightness (or change in brightness) for that pixel. In this manner, an image can be formed on the liquid crystal display cell. It will be recognized that operation of rows and columns in this description can be inverted. For example, one alternative arrangement would include the addressing of a single column at a time with a data signal provided to the row drivers to indicate for each pixel in the column the brightness (or change in brightness) for that pixel.

Figure 3:
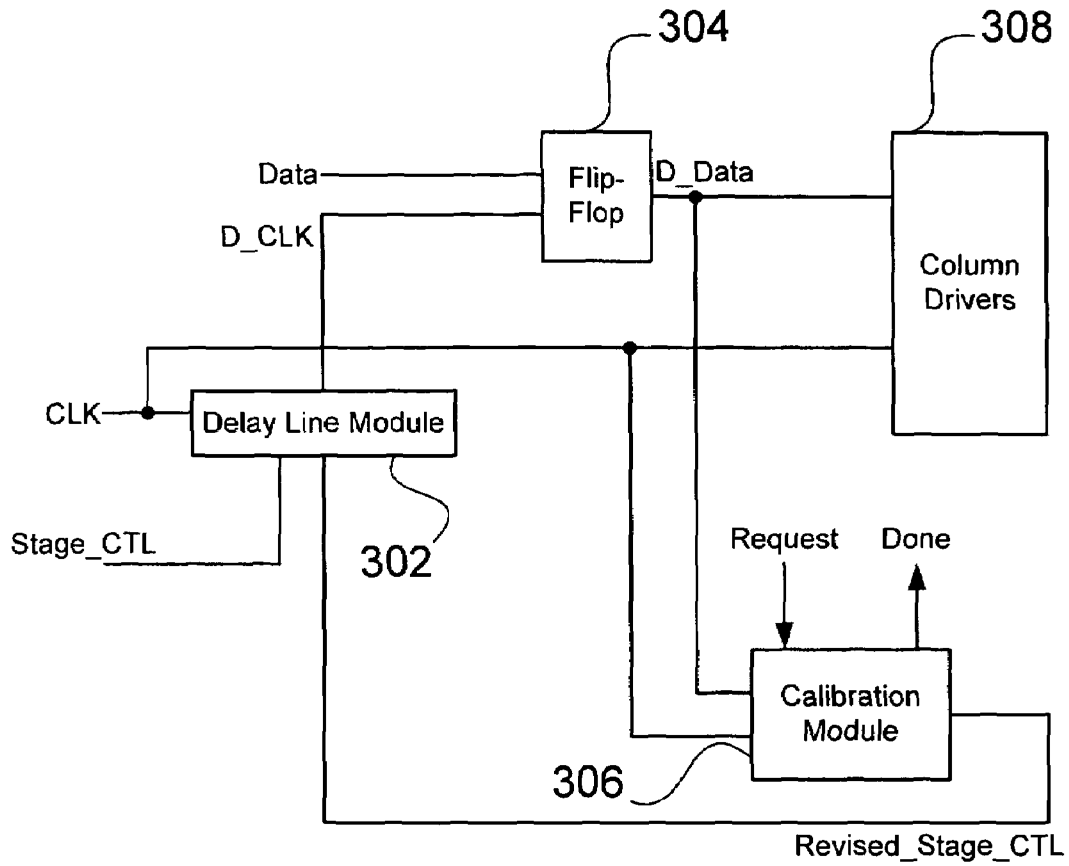
FIG. 3 is a schematic illustration of one embodiment of a portion of a timing controller and drivers of the display of FIGS. 1 and 2, according to the inventions.

FIG. 3 illustrates schematically a driver arrangement that includes elements of the timing controller and column drivers of the display. The driver arrangement includes a delay line module 302, a flip-flop 304, a calibration module 306, and the column drivers 308. A clock signal (CLK) is input into the delay line module 302 and a delayed clock signal (D_CLK) is the resulting output. The delay period can be governed by a Stage_CTL signal from the processor or timing controller (or can be hardwired or otherwise set by the circuitry of the display) and, as described below, the Revised_Stage_CTL signal from the calibration module 306. Before any calibration occurs, Revised_Stage_CTL is set to Stage_CTL.

The delay line module can be a single component or the delay line module can contain multiple components such as, for example, a delay line and a controller that directs the delay line to provide a delay period based on the Stage_CTL and Revised_Stage_CTL signals. Generally, any delay line having multiple, selectable delay periods for output can be used.

The D_CLK signal from the delay line module is directed to the flip-flop 304 which also receives that data signal (DATA) that provides the pixel control information for the column driver 308. This combination of inputs to the flip-flop 304 results in the production of a delayed data signal (D_DATA) that is delayed relative to CLK by an amount determined by the selection of a delay period from the delay line module 302. The D_DATA and CLK signals are provided to the column drivers 308 to be used in controlling the individual pixels and forming the image on the display.

As indicated above, changes in manufacturing process, design, components, voltage, temperature, and other environmental factors can result in changes in the actual delay period produced by the delay line module and the actual delay of D_DATA with respect to CLK. In other words, the actual delay period can be altered from the predetermined or desired delay period by one or more of these or other factors. This can result in defects in the image generated by the display. A calibration module 306 is provided to at least partially (and, preferably, fully) correct for this variation in the delay period.

Figure 4:
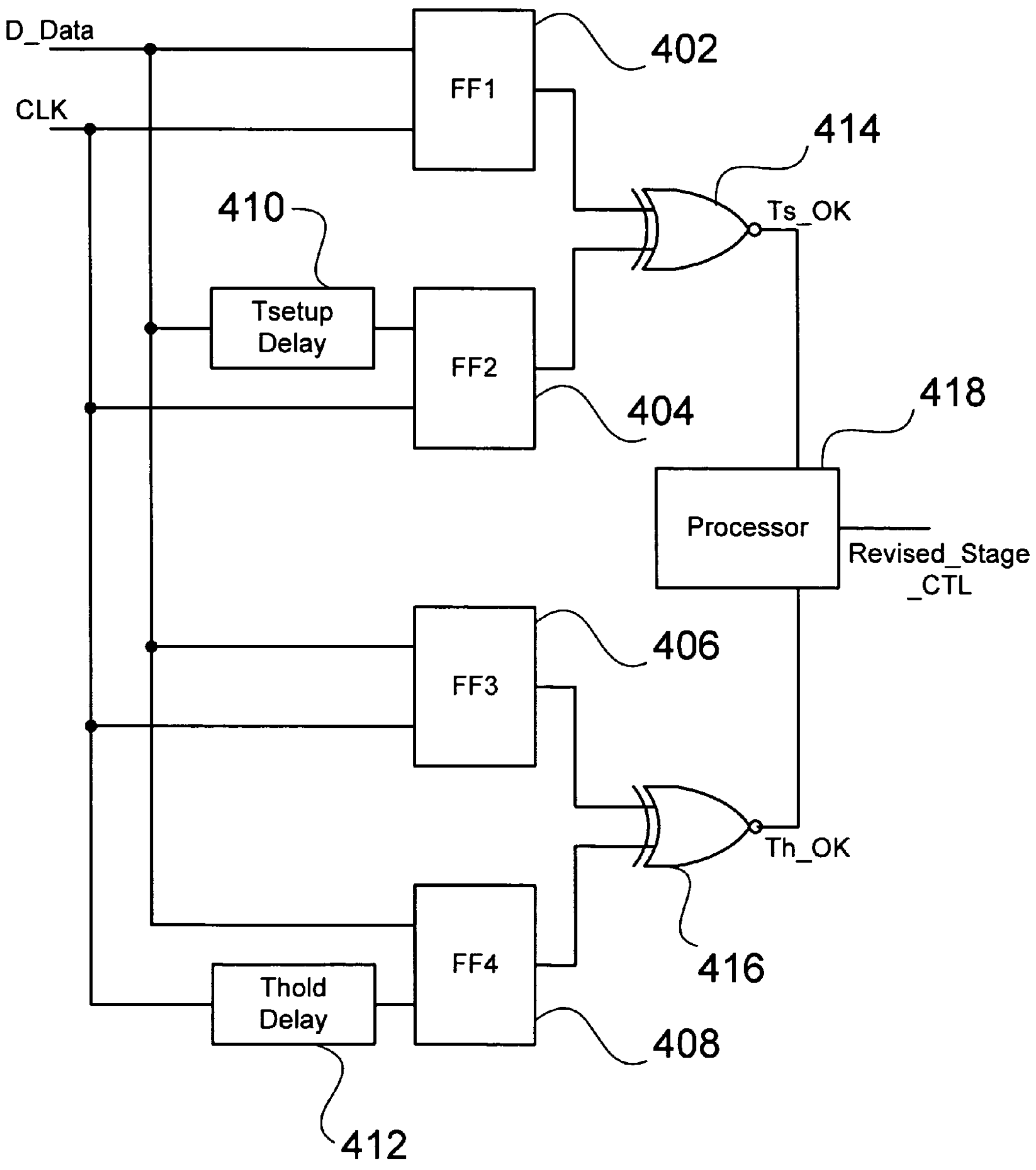
FIG. 4 is a schematic illustration of one embodiment of a portion of a calibration module, according to the inventions.

FIG. 4 is a schematic illustration of a portion of one embodiment of the calibration module 306. The calibration module includes flip-flops 402, 404, 406, 408; tsetup delay 410; thold delay 412; XNOR gates 414, 416; and processor 418. The delayed data (D_DATA) and the clock signal (CLK) are the inputs to the calibration module. In at least some embodiments, only a portion of the delayed data, such as the first bit, is used in the calibration module. D_DATA and CLK are provided to flip-flop 402 (FF1) and flip-flop 406 (FF3) with no modification. In one embodiment, the FF1 and FF3 are the same flip-flop providing output to both XNOR gates 414, 416. In other embodiments, FF1 and FF3 are separate flip-flops.

For flip-flop 404 (FF2), D_DATA is further delayed incrementally by the tsetup delay 410. The tsetup delay is a search engine that uses the same or a similar delay line as that used in delay line module 302. Preferably, the tsetup delay uses the same type of delay line as that used in the delay line module with the same associated circuitry and layout. The tsetup delay 410 is increased by one delay increment per time until the output of flip-flops 402 and 404 are no longer matched as indicated by the output, Ts_OK, of the XNOR gate 414. When this non-matching condition is met, the tsetup index associated with the current delay is noted as Tsetup_Index.

For flip-flop 408 (FF4), CLK is delayed incrementally by the thold delay 412. The thold delay is a search engine that uses the same or a similar delay line as that used in delay line module 302. Preferably, the thold delay uses the same type of delay line as that used in the delay line module with the same associated circuitry and layout. The thold delay 412 is increased by one delay increment per time until the output of flip-flops 406 and 408 are no longer matched as indicated by the output, Th_OK, of the XNOR gate 416. When this non-matching condition is met, the thold index associated with the current delay is noted as Thold_Index.

The Tsetup_Index and Thold_Index are compared in the processor 418 to determine whether the delay period of the delay line module should be adjusted. In one embodiment, the difference between Tsetup_Index and Thold_Index is compared with predetermined parameters, a and b, that are associated with the desired, predetermined delay period of the delay line module. If a<Tsetup_Index−Thold_Index<b then the calibration is completed. The parameters a and b represent the acceptable range in difference between Tsetup_Index and Thold_Index. These parameters can be determined for each particular application and will depend on factors such as the particular delay line module or delay line component used in the circuit and/or the drivers selected for the product. In one example, a and b are selected to be 0 and 3, respectively. If a is near 0, then the setup time is approximately the same as the hold time. The calibration will also be considered complete (or alternatively indicate an error) if both the Tsetup_Index and Thold_Index reach the value for the delay line.

If neither of the two conditions for completion of the calibration are met, then Revised_Stage_CTL is set to a new value corresponding to (current value of Revised_Stage_CTL+(Thold_Index−Tsetup_Index)/2−a) and the calibration is repeated until one of the two conditions is met. An appropriate signal to generate this adjustment is sent by the calibration module 306 to the delay line module 302 as Revised_Stage_CTL.

The calibration procedure can be initiated at one or more times during operation of the display. For example, the calibration procedure can be initiated when the display is first turned on. The result of the calibration can be stored, if desired, for subsequent use. Alternatively or additionally, the calibration procedure can be initiated each time the display is turned on. In addition or as an alternative, the calibration procedure can be initiated periodically to address changes in the environment such as changes in voltage, temperature, or other environmental factors. As yet another alternative, the calibration procedure can be initiated manually or by the processor on an irregular basis.

The calibration module optionally has a Request input and a Done output, as illustrated in FIG. 3. The Request input can be used to initiate a calibration procedure when desired and the Done output can be used to indicate that the calibration procedure is finished so that the calibration module can be powered down. Powering-down the calibration module can be particularly useful for displays where power consumption is a design criterion.

Figure 5:
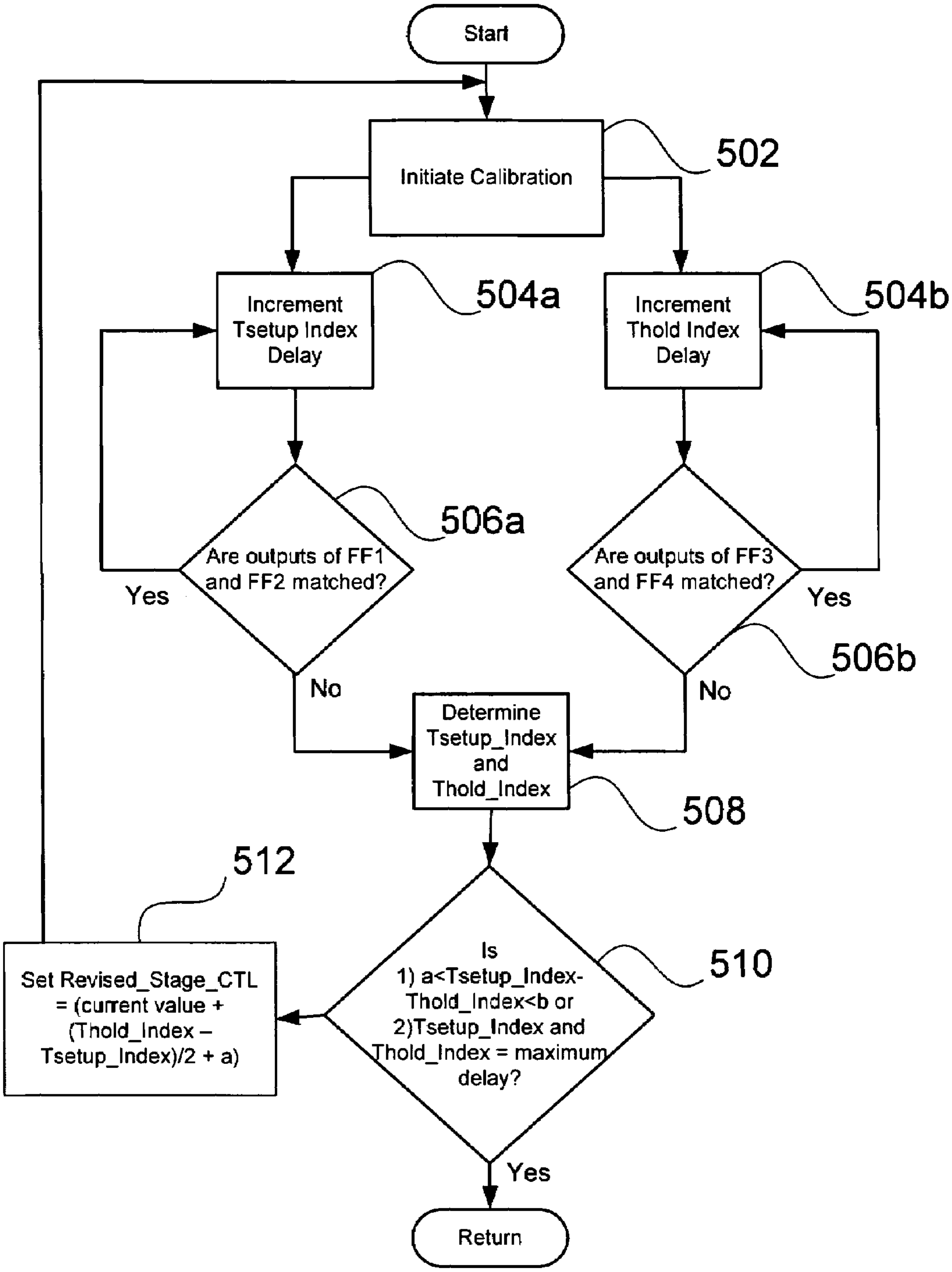
FIG. 5 is a flow diagram illustrating one embodiment of a method of calibrating a delay line, according to the inventions.

FIG. 5 illustrates a flow-chart of one embodiment of a method for calibrating a delay period. As a first step to calibrate the delay period, the calibration module is initiated (step 502). This initiation can occur at one or more times depending on the implementation in the particular display. For example, initiation can occur when the display is first powered up; each time the display is powered up; at regular or irregular intervals during operation of the display; and/or by manual or processor initiation. Upon calibration initiation, at least a portion of the delayed data (D_Data) and the clock (CLK) signals are provided to the calibration module. The Tsetup delay and Thold delay are incremented to delay the D_Data signal to FF2 and CLK signal to FF4 respectively (steps 504*a* and 504*b*).

FF1 and FF2 are compared to determine if their outputs are matched (step 506*a*). If the outputs are matched then the Tsetup delay is incremented again (step 504*a*) and this process continues iteratively until the outputs of FF1 and FF2 are not matched. Similarly, FF3 and FF4 are compared to determine if their outputs are matched (step 506*b*) and the Thold delay is incremented iteratively until these two outputs do not match.

After Tsetup delay and Thold delay have been incremented sufficiently that the respective outputs of the flip-flops do not match, Tsetup_Index and Thold_Index are determined from these delays (step 508). Tsetup_Index and Thold_Index are then compared (for example, their difference is observed) to determine whether the delay period arising from the delay line deviates by more than a threshold amount from a predetermined delay period (step 510). In the exemplified embodiment, the difference between Tsetup_Index and Thold_Index, $\alpha$, is compared to predefined parameters a and b to determine if $a<\alpha<b$. Parameters a and b relate to the desired delay period. If this condition is met, the calibration process is complete. In addition, the calibration process is complete (or, alternatively, an error is declared) if Tsetup_Index and Thold_Index are both equal to the maximum delay period. If neither condition is met, then the Revised_Stage_CTL signal is set equal to (current value of Revised_Stage_CTL+(Thold_Index−Tsetup_Index)/2−a) (step 512) to adjust the delay period and the calibration is repeated until either of the two conditions indicated above is met. Optionally, once the calibration module has completed the calibration it registers that the calibration is done and the calibration module is turned off until another calibration cycle is initiated.

The above specification, examples and data provide a description of the manufacture and use of the composition of the invention. Since many embodiments of the invention can be made without departing from the spirit and scope of the invention, the invention also resides in the claims hereinafter appended.

What is claimed as new and desired to be protected by Letters Patent of the United States is:

1. A driver arrangement for a display, the driver arrangement comprising:

a driver; and a delay line arrangement coupled to the driver and configured and arranged to delay a data signal provided to the driver by a delay period selectable from a plurality of possible delay periods, wherein the delay line arrangement comprises a delay line module configured and arranged to receive a clock signal and provide a delayed clock signal, a data delay module configured and arranged to receive the delayed clock signal from the delay line module and a data signal and to provide a delayed data signal, and a calibration module configured and arranged to receive the clock signal and the delayed data signal, wherein, when requested, the calibration module is configured and arranged to provide an input to the delay line module to adjust a current delay period produced by the delay line module towards a predetermined delay period, and wherein the calibration module comprises a tsetup delay that is configured and arranged to delay the delayed data signal by a selectable delay period.

2. The driver arrangement of claim 1, wherein the calibration module comprises a first flip-flop having the clock signal and delayed data signal as inputs and a second flip-flop having the clock signal and the delayed data signal further delayed by the tsetup delay as inputs.

3. The driver arrangement of claim 2, wherein the calibration module is configured and arranged to determine a tsetup index corresponding to the tsetup delay selected so that outputs of the first and second flip-flops are not matched.

4. The driver arrangement of claim 1, wherein calibration module comprises a thold delay that is configured and arranged to delay the clock signal by a selectable delay period.

5. The driver arrangement of claim 4, wherein the calibration module comprises a third flip-flop having the clock signal and delayed data signal as inputs and a fourth flip-flop having the clock signal delayed by the thold delay and the delayed data signal as inputs.

6. The driver arrangement of claim 5, wherein the calibration module is configured and arranged to determine a thold index corresponding to the thold delay selected so that outputs of the third and fourth flip-flops are not matched.

7. The driver arrangement of claim 6, wherein the calibration module comprises a first flip-flop having the clock signal and delayed data signal as inputs and a second flip-flop having the clock signal and the delayed data signal further delayed by the tsetup delay as inputs and the calibration module is configured and arranged to determine a tsetup index corresponding to the tsetup delay selected so that outputs of the first and second flip-flops are not matched and wherein the calibration module, based on the thold index and the tsetup index, provides a signal to the delay line module to adjust the current delay period produced by the delay line arrangement towards the predetermined delay period.

8. The driver arrangement of claim 1, wherein the driver comprises a plurality of column drivers.

9. A method of calibrating a delay period for a data signal provided to a driver of a display, the method comprising:

delaying a clock signal by a current delay period, using a delay line module, to generate a delayed clock signal;

delaying a data signal by the current delay period, using the delayed clock signal, to provide a delayed data signal from the driver;

providing at least a portion of the delayed data signal and the clock signal to a calibration module;

determining a relationship between a setup time and a hold time for the delayed data signal using the calibration module;

incrementally delaying the delayed data signal by additional delay periods to form a new delayed data signal and providing the delayed data signal and the clock signal to a first flip-flop and providing the new delayed data signal and the clock signal to a second flip-flop and comparing outputs from the first and second flip-flops to determine when the outputs are not matched to give a tsetup index; and providing a signal from the calibration module to the delay line module to adjust the current delay period towards a predetermined delay period based on the relationship between the setup time and the hold time.

10. The method of claim 9, wherein providing at least a portion of the delayed data signal comprises providing a first bit of the delayed data signal.

11. The method of claim 9, further comprising incrementally delaying the clock by additional delay periods to form a delayed clock signal and providing the delayed data signal and the clock signal to a third flip-flop and providing the delayed data signal and the delayed clock signal to a fourth flip-flop and comparing outputs from the third and fourth flip-flops to determine when the outputs are not matched to give a thold index.

12. The method of claim 11, wherein determining a relationship between a setup time and a hold time comprises determining a relationship between the tsetup index and the thold index.

13. The method of claim 12, wherein adjusting the current delay period towards a predetermined delay period comprises sending a signal based on the relationship between the tsetup index and the thold index from the calibration module to the delay line module to adjust the current delay period.

14. A display comprising:

a pixelized display cell;

a driver configured and arranged to facilitate formation of an image using the pixelized display cell; and a delay line arrangement coupled to the driver and configured and arranged to delay a data signal provided to the driver by a delay period selectable from a plurality of possible delay periods, wherein the delay line arrangement comprises a delay line module configured and arranged to receive a clock signal and provide a delayed clock signal, a data delay module configured and arranged to receive the delayed clock signal from the delay line module and a data signal and to provide a delayed data signal, and a calibration module configured and arranged to receive the clock signal and the delayed data signal, wherein, when requested, the calibration module is configured and arranged to provide an input to the delay line module to adjust a current delay period produced by the delay line module towards a predetermined delay period, wherein the calibration module comprises a tsetup delay to further delay the delayed data signal provided to the tsetup delay.

15. The display of claim 14, wherein the display is a liquid crystal display.

16. The display of claim 14, wherein the calibration module comprises:

a thold delay to delay a clock signal provided to the tsetup delay;

a first flip-flop having the delayed data signal and clock signal as inputs;

a second flip-flop having the signal from the tsetup delay and the clock signal as inputs;

a third flip-flop having the delayed data signal and clock signal as inputs;

a fourth flip-flop having the delayed data signal and the signal from the thold delay as inputs;

a first XNOR gate to receive output signals from the first and second flip-flops; and a second XNOR gate to receive output signals from the third and four flip-flops.

* * * * *

UNITED STATES PATENT AND TRADEMARK OFFICE

CERTIFICATE OF CORRECTION

PATENT NO. : 7,564,454 B1
APPLICATION NO. : 11/005139
DATED : July 21, 2009
INVENTOR(S) : Peter Shing et al.

It is certified that error appears in the above-identified patent and that said Letters Patent is hereby corrected as shown below:

In column 10, line 10, in claim 16, delete "four" and insert -- fourth --, therefor.

Signed and Sealed this

Eighth Day of December, 2009

David J. Kappos

*Director of the United States Patent and Trademark Office*